(12) United States Patent
Arndt

(10) Patent No.: US 10,800,924 B2
(45) Date of Patent: Oct. 13, 2020

(54) TOY BUBBLE FORMING COMPOSITION CONTAINING GLITTER

(71) Applicant: Cathy Cowan, Manhattan Beach, CA (US)

(72) Inventor: Douglas Charles Arndt, Stallion Springs, CA (US)

(73) Assignee: Cathy Cowan, Manhattan Beach, CA (US)

( * ) Notice: Subject to any disclaimer, the term of this patent is extended or adjusted under 35 U.S.C. 154(b) by 0 days.

(21) Appl. No.: 15/732,556

(22) Filed: Nov. 27, 2017

(65) Prior Publication Data

US 2019/0338136 A1   Nov. 7, 2019

(51) Int. Cl.
   *A63H 33/28* (2006.01)
   *C09C 1/00* (2006.01)
   *B01F 17/00* (2006.01)

(52) U.S. Cl.
   CPC ........ *C09C 1/0021* (2013.01); *B01F 17/0092* (2013.01); *A63H 33/28* (2013.01); *C09C 2200/102* (2013.01)

(58) Field of Classification Search
   None
   See application file for complete search history.

(56) References Cited

U.S. PATENT DOCUMENTS

| | | | | |
|---|---|---|---|---|
| 2,089,305 A * | 8/1937 | Stickdorn | ................ | C11D 9/02 510/437 |
| 2,093,928 A * | 9/1937 | Preston | .................... | C11D 9/14 510/437 |
| 2,391,797 A * | 12/1945 | Raspet | ................... | A63H 33/28 446/21 |
| 2,514,009 A * | 7/1950 | Raspet | ................... | A63H 33/28 446/15 |
| 2,551,634 A * | 5/1951 | Price | ....................... | C11D 9/002 510/242 |
| 3,630,951 A * | 12/1971 | Netherly | ................ | A63H 33/28 516/12 |
| 4,434,010 A * | 2/1984 | Ash | ........................ | B05D 1/286 106/415 |
| 5,246,631 A | 9/1993 | Halbritter | | |
| 6,139,613 A * | 10/2000 | Hendrickson | ............. | B32B 7/02 106/415 |
| 6,596,070 B1 * | 7/2003 | Schmidt | .................... | A61Q 1/02 106/415 |
| 6,737,393 B2 | 5/2004 | Lin | | |
| 9,109,156 B2 | 8/2015 | Guo | | |
| 2002/0019470 A1 * | 2/2002 | Ammon, Jr. | ........ | B01F 17/0021 524/253 |
| 2005/0176850 A1 * | 8/2005 | Schmidt | ............... | A61K 8/0258 523/160 |
| 2006/0004110 A1 * | 1/2006 | Sabnis | .................... | C11D 1/146 516/10 |
| 2006/0027140 A1 * | 2/2006 | Kniess | .................. | C09C 1/0024 106/415 |
| 2006/0051304 A1 * | 3/2006 | Peng | ........................ | A61K 8/26 424/59 |
| 2006/0154555 A1 * | 7/2006 | Gomzar | .................. | A63H 33/28 446/19 |
| 2006/0225609 A1 * | 10/2006 | Rueger | .................. | C09C 1/0063 106/31.9 |
| 2008/0200560 A1 * | 8/2008 | Kniess | ...................... | A61K 8/19 514/769 |
| 2008/0210123 A1 * | 9/2008 | Kniess | ...................... | A61K 8/11 106/31.6 |
| 2009/0252695 A1 * | 10/2009 | Peng | ........................ | A61K 8/26 424/63 |
| 2010/0015337 A1 * | 1/2010 | Becker | ..................... | B41M 3/14 427/258 |
| 2012/0035311 A1 * | 2/2012 | Li | .......................... | A63H 33/28 524/388 |
| 2012/0244777 A1 * | 9/2012 | Sabnis | ................... | A63H 33/28 446/15 |
| 2016/0206530 A1 * | 7/2016 | Peng | ....................... | A61K 8/26 |

FOREIGN PATENT DOCUMENTS

| | | |
|---|---|---|
| JP | 3169614 U | 8/2011 |
| JP | 2012-230717 A | 11/2012 |

OTHER PUBLICATIONS

IPRP Chapter I PCT/WO2018/062559.

* cited by examiner

*Primary Examiner* — Peter A Salamon
(74) *Attorney, Agent, or Firm* — Alexander R. Schlee; Schlee IP International, PC

(57) ABSTRACT

An aqueous, bubble forming composition is provided that contains glitter, wherein the glitter is strongly both lipophilic and hydrophilic and therefore able to preferentially release from the contact surface of the bubble forming toy while maintaining the structural integrity of the bubbles.

4 Claims, No Drawings

TOY BUBBLE FORMING COMPOSITION CONTAINING GLITTER

BACKGROUND OF THE INVENTION

Surfactant solutions have been used for many years in children's toys to create bubbles. The simplest toy comprises a ring that is first dipped into the surfactant solution, then held near the mouth so that exhaled air forced through the ring causes the surfactant film therein to release as one or more bubbles. A plurality of rings may be enjoined to form a dipping device that can be waved manually in the air to create a large number of bubbles from a single loading of surfactant solution. Manual pumps may also be used to generate a stream of bubbles by forcing air through a nozzle that is supplied by a reservoir of surfactant solution. A continuous stream of bubbles may be shot from a toy gun wherein a motorized pump forces air and surfactant solution into a nozzle when an electrical trigger is depressed. Still other toys use a motor driven fan to direct a stream of air through revolving windows having a film of surfactant solution within them. These more elaborate systems are designed for the purpose of greatly increasing the rate at which a great number of bubbles may be created.

Other ways to stimulate excitement from bubble producing toys is to add visual effects to the surfactant solution. Dyes used for this purpose can make bubbles that are brightly colored. Similarly, U.S. Pat. No. 5,961,894 teaches the use of fluorescent dyes. Rainbow patterns in bubbles can be created by adding polyethylene glycol to the surfactant composition. Attempts have been made to add light-reflecting glitter to impart sparkle to the bubbles, but to date, these attempts have failed to produce an invention that actually forms bubbles having any significant amount of glitter within them, or one that forms bubbles that last for more than just two to three seconds before they burst. The present invention solves the problem of short-lived bubbles having virtually no visible glitter.

SUMMARY OF THE INVENTION

Bubble forming compositions for children's toys are typically aqueous solutions of at least one surface active agent and film producing substance. Endless variations are possible and they can be modified as desired to exhibit preferred properties, or to suspend water insoluble materials such as a glitter. The glitter found in the prior art is of the thermoplastic kind, specifically, polyester film which has been finely cut. This kind of glitter tends to be deleterious to the structural integrity of bubbles, perhaps due to its hydrophobic nature or to its sharp angularity. Furthermore, polyester glitter tends to adhere to the wetted, contact surface of the bubble generating mechanism rather than release into the bubbles as they form, perhaps because of its attraction to the other thermoplastics involved. Another problem is that polyester glitter is relatively large in flake size due to limitations associated with cutting it from sheets, which may explain why it can impair bubble formation or fail to transfer into the bubbles. Aluminum flake glitter can be obtained in a suitable flake size, however, it interacts with water to release hydrogen, making the aqueous composition acidic and therefore unstable over time with respect to viscosity. Quite surprisingly and unexpectedly, it has been discovered that a glitter made from mica enables one to readily blow bubbles having both a high degree of durability and a highly visible concentration of glitter within them.

Glitters produced from mica, particularly from mica that has been surface treated with a metal or an oxide thereof, are what is believed to be novel in relation to the present invention. While not fully understood by the inventor, it is thought that the hydrophilic nature of mica, combined with the lipophilic nature of its metallic coating, are perhaps why it is able to preferentially release from the bubble generating aperture and improve the longevity of bubble life. To reiterate, a typical composition for making bubbles comprises water and some surfactant, and so cohesion within the composition can be created by the attraction of mica to water and by the attraction of the metal coating thereon to the lipophile on the surfactant's molecule. These attractions are believed to be vital during the developmental stage when the bubble begins to expand and exit the toy's ring or nozzle. Cohesion within the bubble's structure must be strong enough to contain the higher, internal air pressure relative to the lower, external air pressure. Otherwise, the bubble will disintegrate and burst.

Metallized micas are available in a range of colors, depending of the metal itself. For example, titanium dioxide is used to make a silvery luster. Iron oxides create a range of golden colors. Copper oxides yield reddish tones. Chromium oxides are associated with green shades. Other metal oxides can produce iridescent colors.

DESCRIPTION OF THE PREFERRED EMBODIMENT

Mica based glitters are available in flake sizes as small as 10 microns. Micas having a flake size up to 200 microns may be used when the bubble walls are sufficiently thick, but in general a range of 40 to 150 microns is suitable, and the preferred range is 70 to 100 microns. Larger flake sizes produce more sparkle than do smaller flakes sizes. A suitable range of concentration of this glitter is about 0.1 percent by weight to about 5 percent by weight, although higher concentrations may be used to create densely glittered bubbles. Trials demonstrate that bubble life is about 8 seconds at a minimum, but is typically 12 to 20 seconds, and often more than 30 seconds, when the concentration of glitter is less than about 4 percent by weight. One glitter type, a family of metallic micas, which produces exemplary results, is Iriodin™, manufactured by EMD Performance Materials Corporation. Iriodin™ Flash Pearl 153 and Iriodin™ Solar Gold 325 are two choices for silver and gold glitters respectively.

A bubble forming composition that may be used in accordance with the present invention is, percent by weight:
2% cocamidopropykle betaine, 36% solution
1% Botanistat™ PF-64 (by Botanigenics, Inc. Chatsworth, Calif.)
1.2% sodium coco sulfate, 94-100% active
0.4% xanthan gum
0.4% propylene glycol alginate
95% distilled water It is understood in the art that numerous other compositions may be substituted for the one disclosed herein without departing from the spirit and the scope of the present invention.

What is claimed:
1. A bubble forming composition comprising water, at least one surface active agent, at least one film forming substance, and a glitter comprising mica having a metal or metal oxide deposited thereon, wherein the mica has a flake size of about 70 microns to about 100 microns.

2. The bubble forming composition of claim 1 wherein the metal oxide is an oxide of titanium, iron, copper, or chromium.

3. The bubble forming composition of claim 1 wherein the concentration of glitter is about 0.1 percent to about 10 percent by weight of the composition.

4. The bubble forming composition of claim 1 herein the concentration of glitter is about 0.2 percent to about 4 percent.

\* \* \* \* \*